United States Patent
Haikin et al.

(10) Patent No.: US 6,642,931 B1
(45) Date of Patent: Nov. 4, 2003

(54) DYNAMICALLY-GENERATED COLOR LOOK-UP TABLE

(75) Inventors: John S. Haikin, Fremont, CA (US); Rong Wang, Union City, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 377 days.

(21) Appl. No.: 09/679,910

(22) Filed: Oct. 5, 2000

(51) Int. Cl.$^7$ ................................................ G09G 5/02
(52) U.S. Cl. ........................ 345/601; 345/602; 345/604; 345/606; 345/591; 382/162; 358/518
(58) Field of Search ................................. 345/602, 603, 345/604, 591, 601, 606; 382/162; 358/518

(56) References Cited

U.S. PATENT DOCUMENTS

| | | | |
|---|---|---|---|
| 4,654,720 A | 3/1987 | Tozawa ..................... 358/283 |
| 5,627,950 A | 5/1997 | Stokes ..................... 395/131 |
| 5,764,795 A | 6/1998 | Takeo et al. ............... 382/167 |
| 5,867,143 A | 2/1999 | Penna ..................... 345/141 |
| 6,023,527 A | 2/2000 | Narahara ..................... 382/167 |
| 6,072,902 A | * 6/2000 | Myers ..................... 382/167 |
| 6,437,792 B1 | * 8/2002 | Ito et al. ..................... 345/600 |

* cited by examiner

Primary Examiner—Joseph Mancuso
Assistant Examiner—Antonio Caschera
(74) Attorney, Agent, or Firm—Fitzpatrick, Cella, Harper & Scinto

(57) ABSTRACT

The present invention comprises a method, for use in a color management system executing in a computer system, for generating at runtime, using device profile information, a look-up table for conversion of color data from one color space to another, the method comprising assigning a weight to each of table size, speed and accuracy factors, determining, for plural table sizes, corresponding speed and accuracy scores using the color management system, determining, for each of the plural table sizes, an aggregate of weighted scores corresponding to table size and speed and accuracy, selecting one of the plural table sizes using the aggregate of each of the plural table sizes, and generating a look-up table having the selected one of the plural table sizes.

23 Claims, 8 Drawing Sheets

DYNAMICALLY-GENERATED COLOR LOOK-UP TABLE

BACKGROUND OF THE INVENTION

1. Field of the Invention

The present invention relates to the dynamic creation of a look-up table for mapping between color spaces. More particularly, the invention concerns creation of such table at runtime using a device's profile so as to optimize color-matching performance and best take advantage of the resources of a particular computing system.

2. Description of the Related Art

One goal of modern color management is generation of uniform output images using different color image output devices. In particular, it is desired that a color image generated for output using a first image output device would appear similar if output using a second different image output device. For example, one computer system could use color image data to generate color image output using a color laser printer. The same color image data could also be output by a color ink jet printer coupled to a second computer system. In such a case, it would be preferable that the color image output from the color laser and ink jet printers both appear similar.

However, a color defined in the color image data may be interpreted or represented differently by different output devices.

Colors are defined using a color model, or color space. Examples of color spaces include RGB (red, green and blue), CMY (cyan, magenta and yellow) and CMYK (cyan, magenta, yellow and black). Color spaces may be device dependent, such as the above examples, since they define the colors that may be output by a given device. Other color spaces are device independent, since they are not associated with a particular device. Examples of device independent color spaces include CIELab which is a color appearance space and CIEXYZ which is a device independent color measurement space.

One conventional technique for attempting to ensure similar output images from different image output devices involves a process by which the color image data is transformed from a device-dependent color space to a device-independent color space. A device profile associated with a given device provides the information necessary to convert device dependent color data of a given device to a device independent color space.

A color management system transforms colors from one color device's color space to another device's color space. For example, in a printing process, a color is transformed from a monitor's RGB values to a printer's CMY values. During the transformation process, colors are matched between the two devices usually by first generating a device independent color space interpretation. The device independent output may then be converted to one or more other device dependent color spaces for use by a particular device.

A color management system may implement an algorithmic model to perform the transformation between color spaces using parametric data provided in a device profile, or use a look-up table to convert from one color space to another. Typically, an algorithmic process is used for monitors, while the look-up table approach is used for printers.

In one example of the algorithmic process, monitor-specific color data is converted to a printer's color space by first transforming the monitor color data to a device independent color appearance space (e.g., CIELab). A gamut mapping is performed on the CIELab output to map the colors to the gamut of colors of the printer. The gamut-mapped CIELab is then transformed into the printer-specific color space using the printer's device profile.

A monitor device profile typically includes three 1-D input lookup tables (LUTS) one for each of red, green and blue colors, and a 3×3 matrix which is used to convert from RGB to CIEXYZ. An algorithm in the color management module is used to convert from CIEXYZ to color appearance space. The monitor profile contains the needed parameters as input to the transformation algorithm used to transform the CIEXYZ color to the color appearance space.

To make the above process more efficient, a 3-D color look up table (LUT) may be created that combines these three operations. Use of a color LUT avoids the need to perform complicated floating-point calculations otherwise needed to transform each pixel in an image from the XYZ color space to the color appearance space. Instead, the calculations are performed once for each grid point value in the color LUT (e.g., 4913 for a 17×17×17 color LUT). Although use of a color LUT necessarily introduces interpolation calculation into the color-matching process where color data is not one of the grid points of the color LUT, interpolation calculation usually takes much less time in comparison to floating point calculations used in the color appearance conversion.

However, a color LUT is typically quite large and storing a color LUT in a device profile causes the device profile to be considerably larger than a case where the profile stores three 1-D tables and a 3×3 matrix. In addition, there is no ability to change the size of a color LUT dynamically (e.g., at runtime) to take into account the resources available to the color management system.

The number of elements in a color LUT has a major impact on the speed and accuracy as well as the memory requirements of the color management system. The size of a color LUT is directly related to the number of grid steps. The more steps, or points, in the grid, the fewer interpolation calculations are needed and a higher accuracy is achieved. However, the size can be limited by the amount of memory that is available to store the color LUT.

Further, it may be that the computing resources available to the color management system are such that little, if any, advantage is gained using a color LUT over the transformation operations. In such a case, there is no need to use a color LUT, and storage of a color LUT in a profile is unnecessary. However, it is not possible to determine at the time that a profile is generated the computing resources that are available to a color management system that is to use the profile.

Thus, it would be beneficial to use a color LUT based on the computing resources that are available to a color management system. Then, in this case, the number of elements in the color LUT should be chosen in order to take full advantage of the available computing resources.

SUMMARY OF THE INVENTION

The present invention comprises a method, for use in a color management system executing in a computer system, for generating, at runtime using device profile information, a look-up table for conversion of color data from one color space to another. As it is used herein, runtime refers to a time at which the resources of a computer are known during the execution time of a color management system such that the color management system may determine an appropriate color look-up table to optimize color-matching performance and best take advantage of the resources of a particular computing system. A method according to the present invention for dynamically generating a look-up table comprises assigning a weight to each of table size, speed and accuracy factors, determining, for plural table sizes, corresponding speed and accuracy scores using the color management system, determining, for each of the plural table sizes, an aggregate of weighted scores corresponding to table size and speed and accuracy, selecting one of the plural table sizes using the aggregate of each of the plural table sizes, and generating a look-up table having the selected one of the plural table sizes.

Advantageously, the present invention provides the ability to tailor use of a color look-up table to a particular computer system and/or color management system. In addition, it is possible to generate a look-up table to accommodate any changes in requirements between speed and accuracy and/or available computing resources.

The present invention may be used to determine, based on the computing resources that are available to a color management system, whether it is desirable to generate a color LUT, and if so, the number of elements in the color LUT in order to take full advantage of the available computing resources.

This brief summary has been provided so that the nature of the invention may be understood quickly. A more complete understanding of the invention can be obtained by reference to the following detailed description of the preferred embodiment(s) thereof in connection with the attached drawings.

DETAILED DESCRIPTION OF THE PREFERRED EMBODIMENTS

Figure 1:
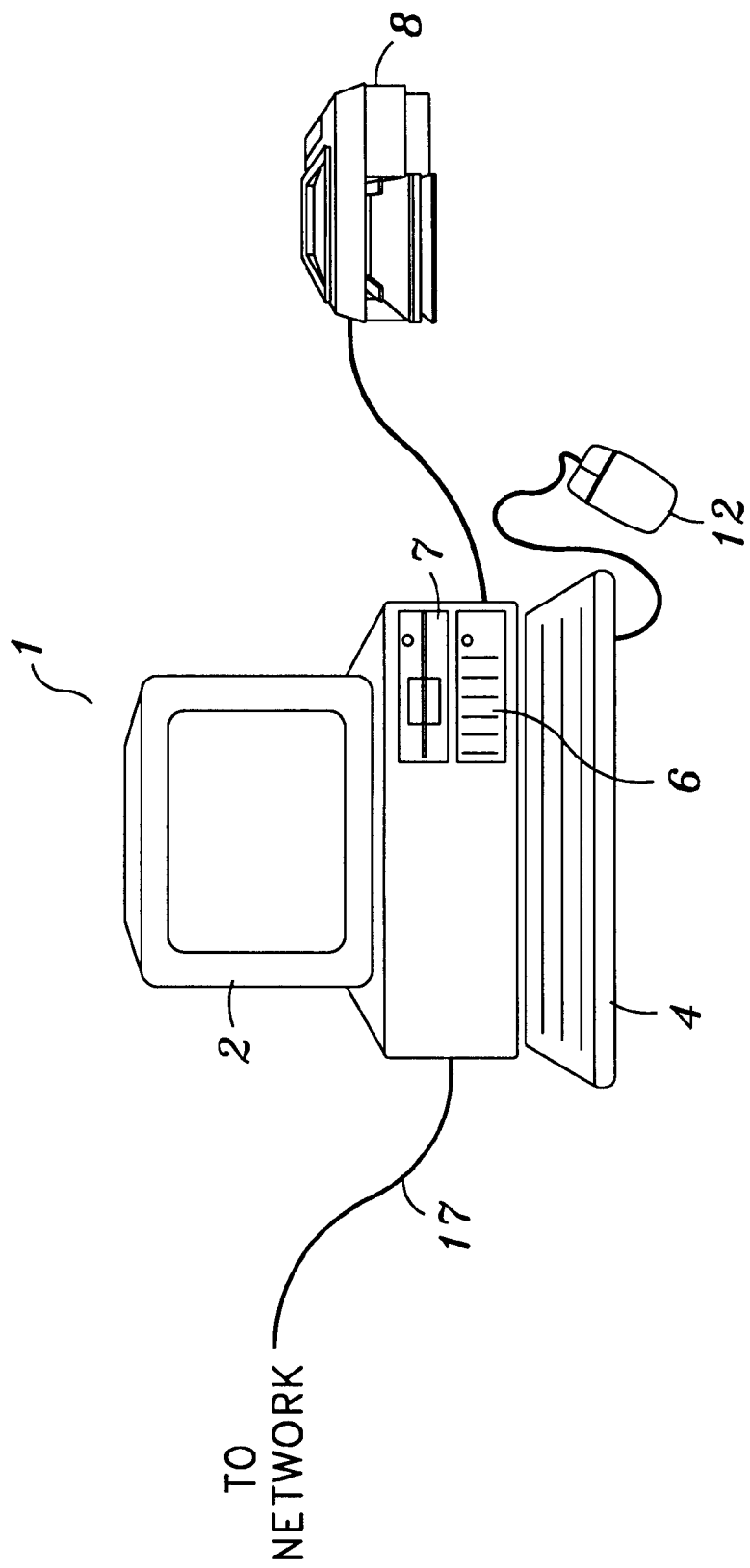
FIG. 1 is an outward view of a hardware environment embodying the present invention.

FIG. 1 is an outward view of representative computing hardware embodying the present invention. Shown in FIG. 1 are computer 1 executing an operating system, such as Microsoft Windows98®, display monitor 2 for displaying text and images to a user, keyboard 4 for entering text and commands into computer 1, and mouse 12 for manipulating and for selecting objects displayed on display monitor 2. Also included with computer 1 are fixed disk drive 6, in which are stored application programs, such as a color management system, data files, and device drivers for controlling peripheral devices attached to computer 1, floppy disk drive 7 for use in reading data from and writing data to floppy disks inserted therein. Data and/or applications may also be accessed from a CD-ROM via a CD-ROM drive (not shown) or over a network to which computer 1 may be connected.

Computer 1 further includes a connection 17 to a network (e.g., World Wide Web, intranet, local area network, etc). Connection 17 may be formed, for example, via a serial modem (not shown) connected to computer 1 and a telephone line which, in turn, is connected to the network. It should be noted that computer 1 may be connected to a network by other types of connections as well.

Figure 2:
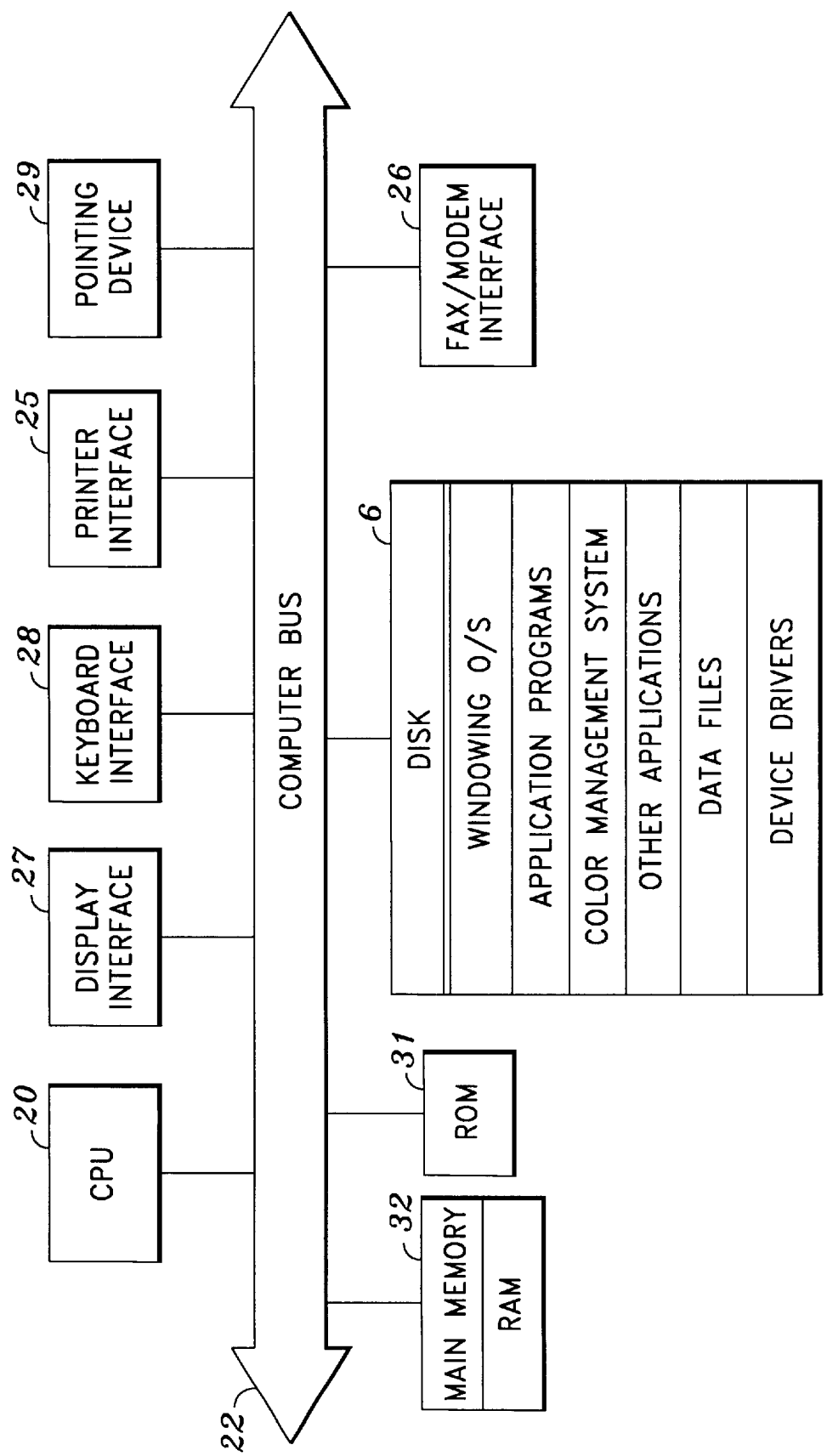
FIG. 2 is a block diagram of the internal architecture of a personal computer for use in conjunction with the present invention.

FIG. 2 is a block diagram of the internal architecture of computer 1. Shown in FIG. 2 are CPU 20, which is preferably a Pentium-type microprocessor, interfaced to computer bus 22. Also interfaced to computer bus 22 are printer interface 25, to allow computer 1 to communicate with printer 8, modem interface 26 to enable communications between computer 1 and its internal modem, display interface 27 for interfacing with display monitor 2, keyboard interface 28 for interfacing with keyboard 4, and pointing device (e.g., mouse) interface 29 for interfacing with mouse 12.

Read only memory (ROM) 31 stores invariant computer-executable process steps for basic system functions such as basic I/O, start up, or reception of keystrokes from keyboard 4.

Main random access memory (RAM) 32 provides CPU 20 with memory storage which can be accessed quickly. In this regard, computer-executable process steps of a color management system or other application are transferred from fixed disk drive (or disk) 6 over computer bus 22 to RAM 32 and executed therefrom by CPU 20.

Also shown in FIG. 2 is disk 6 which, as described above, includes a windowing operating system, a color management system on the particular windowing operating system, other applications which may include word processing, spreadsheet, graphics, gaming applications. Disk 6 further includes data files and device drivers as shown. Data files include device profiles for printer 8 and display 2 that contain data describing the color performance and characteristics of the device.

One aspect of the present invention concerns a color management system configured to dynamically generate a color LUT using device profile information. A color LUT is generated by a color management system during its execution based on knowledge of the resources of a particular computer system. The color management system determines an appropriate color LUT to optimize color-matching performance and best take advantage of the resources of a particular computing system.

According to the present invention, a color management system generates a color LUT in advance of color management of an image and may occur each time a color management system is initialized and/or prior to processing the first (or a subsequently processed) color image. Using the present invention, a color management system may generate a different color LUT in response to a change in resources (e.g., a change in available memory). Alternatively, where a computer system's resources are fairly well fixed, for example, a color management system may generate a color LUT at runtime based on the particular resources of the computer system and cause the color LUT to be stored (e.g., in a device profile or otherwise) for use during the current or a subsequent execution of the color management system.

The present invention may be used with a device profile that already contains a color LUT as well as one that has no stored color LUT. In the former case, the color management system may identify a more optimal color LUT than the one contained in the profile, or the color management system may determine that a transformation module's operations provide more desirable results than any color LUT (i.e., a stored color LUT or one generated at runtime).

In addition, as is discussed below, the present invention provides the ability to configure a color management system based on user-defined priorities associated with factors used in selecting a particular color LUT or deciding to use color transformations instead of a color LUT.

The color management system uses the color LUT for conversion of color data from one color space to another. For example, the color management system may use a color LUT to convert color data generated for display by monitor 2 in the RGB color space to color data in the CMYK color space for output by printer 8. A device independent color space is used as an intermediate color space such that the RGB color data is converted to device independent color data which is in turn converted to CMYK color data.

Figure 3:
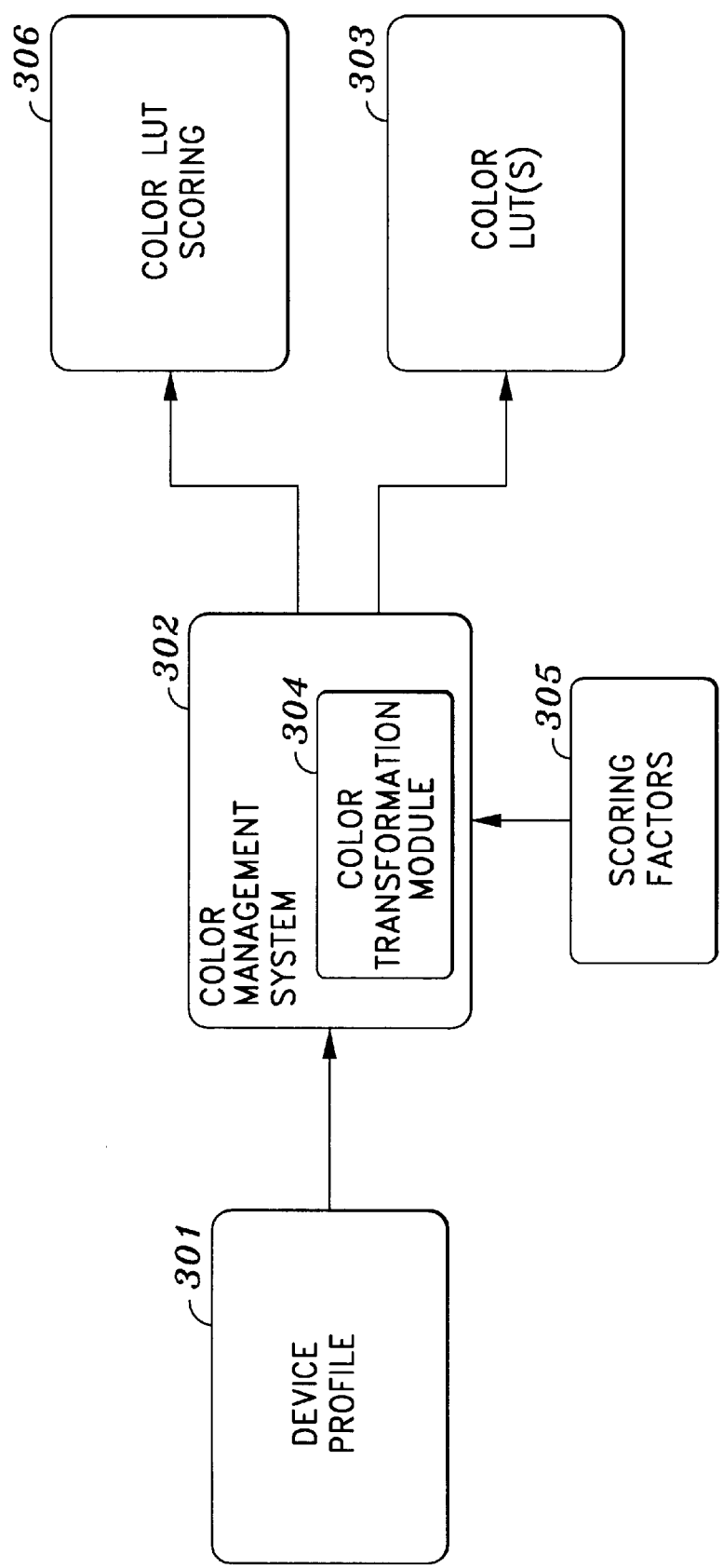
FIG. 3 provides an overview of a color management system configured to generate a color LUT at runtime according to the present invention.

FIG. 3 provides an overview of a color management system configured to dynamically generate a color LUT at runtime according to the present invention.

Color management system (CMS) 302 includes a color transformation module 304 for transforming device dependent color data to device independent color data using transformation operations implemented as programming code, or programming steps. More particularly, in this invention, CMS 302 uses device profile 301 and color transformation module 304 to generate one or more of color LUT 303. Device profile 301 contains color performance and characteristics that may be used to convert colors in a device's color space and color gamut into colors in a device-independent color space.

In a further aspect of the present invention, CMS 302 is configured to identify an optimal color LUT 303 for converting between color spaces and/or whether it is at least as efficient to use color transformation module 304 in place of color LUT 303.

Color transformation module 304 uses transformation operations to convert between color spaces with in most cases greater accuracy than color LUT 303. However, the transformation operations performed by color transformation module 304 typically entail floating-point operations which can be time consuming. In addition, the same color data may be repeated in image data requiring the same transformation to be performed multiple times.

It is usually faster to use color LUT 303 to convert between color spaces. A color LUT 303 contains a matrix, or grid, of points with each point in the grid identifying output color data associated with input color data.

Using the data in one color space as an index into the color LUT, data in another color space may be obtained from color LUT 303. However, not all input color data have a corresponding value in the color LUT. In a case in which there is no exact entry in the color LUT 303 that corresponds to the index color data, an interpolation is performed on the color LUT entries surrounding the exact entry so as to obtain interpolated values. Appropriate interpolation techniques are well known to those skilled in the art and include, for example trilinear interpolation and tetrahedral interpolation.

Interpolation operations may introduce some inaccuracies in the resulting color data, and increase the time taken for the conversion. The greater the number of grid points in an instance of color LUT 303, the fewer the number of interpolations are needed and the greater the accuracy. However, a greater number of grid points yields a larger instance of color LUT 303. The larger the instance of color LUT 303, the more memory that is needed to store color LUT 303, and, in some systems with limited addressing capabilities, the slower the table lookup operation.

Thus, there are tradeoffs associated with configuring CMS 302 to optimize color-matching performance and to best take advantage of the resources of a particular computing system. To facilitate configuration of CMS 302, the present invention provides an ability to specify scoring factors 305 which are used by CMS 302 in determining whether to use a color LUT 303 or transformation operations of color transformation module 304 and, when it is determined to use a color LUT 303, in determining an appropriate number of grid points in color LUT 303 so as to optimize a particular computer system's computing resources.

In making a determination, CMS 302 uses scores associated with selection criteria such as speed, accuracy and memory usage (or table size) in conjunction with scoring factors 305 that identify priorities (or order of importance) of the selection criteria. In addition, scoring factors 305 may include information used to determine whether to conserve or consume available memory. As is discussed in more detail below, information contained in scoring factors 305 is used to associate a score (e.g. color LUT scoring 306) with an instance of color LUT 303 depending on size.

CMS 302 uses color transformation module 304 to generate instances of color LUT 303. In addition, color transformation 304 is used to convert test data. More particularly, CMS 302 converts test data using color transformation module 304 and color LUT 303. Scores are associated with each and used in determining an optimal conversion mechanism (e.g., color transformation module 304 or an appropriate color LUT 303).

Figure 4:
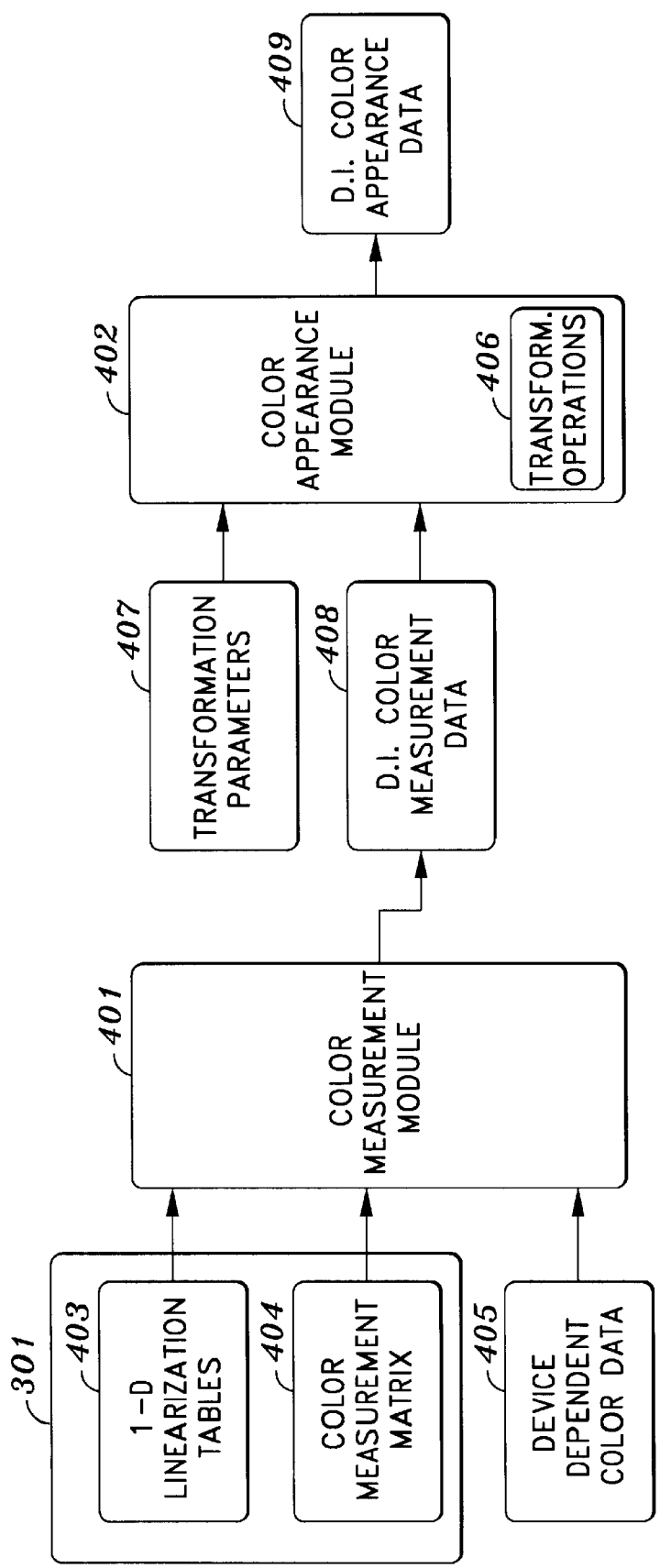
FIG. 4 illustrates use of a device profile by a color transformation module of the color management system, of the present invention, in color data conversion.

The use of information contained in device profile 301 to convert input color data is described in more detail with reference to FIG. 4. Color measurement module 401 and color appearance module 402 are components of color transformation module 304 and use information contained in device profile 301 to perform color data conversion.

Color measurement module 401 uses one-dimensional tables 403 and color measurement matrix 404 of device profile 301 to convert device dependent color data 405 (e.g., color data in the RGB color space) to device independent color measurement data 408 (e.g., color data in the CIEXYZ color space). Color appearance module 402 operates on device independent color measurement data 408 using transformation algorithm(s) 406, and transformation parameters 407 of device profile 301 to generate device independent color appearance data 409 (e.g., color data in CIELab color space).

Each of one-dimensional tables 403 might represent a tonal response curve used to linearize the color data. For example, where device independent color measurement data 408 is in the form of CIEXYZ data and device dependent color data 405 is RGB data, a one-dimensional table 403 is used to linearize each of the R, G and B values of the color data 405 with respect to the luminance (Y) dimension of the CIEXYZ color measurement data 408. Color measurement matrix 404, in the same example, is a 3×3 matrix that converts the RGB color data 405 to CIEXYZ color measurement data 408. The CIEXYZ color measurement data 408 is converted by color appearance module 402 to CIELab color appearance data 409. While examples are provided with reference to the RGB and CIEXYZ color spaces, it should be apparent that other device dependent and device independent color spaces may be used with the present invention.

Device independent appearance data 409 is used to populate a color LUT 303. Alternatively, as is discussed in more detail below, device independent appearance data 409 may comprise converted test data used to determine conversion accuracy of a color LUT 303.

Color LUT 303 is arranged as a multi-dimensional (e.g, three-dimensional or four-dimensional) lattice of grid points with the number of dimensions dependent on the number of color components of the color data. For example, RGB color data has three color components and CMYK color data has four color components. The lattice is arranged at a grid interval, or step, based on the range of values and the number of grid points.

A step may be determined as follows:

max. value/(no. of grid points−1)

Figure 5:
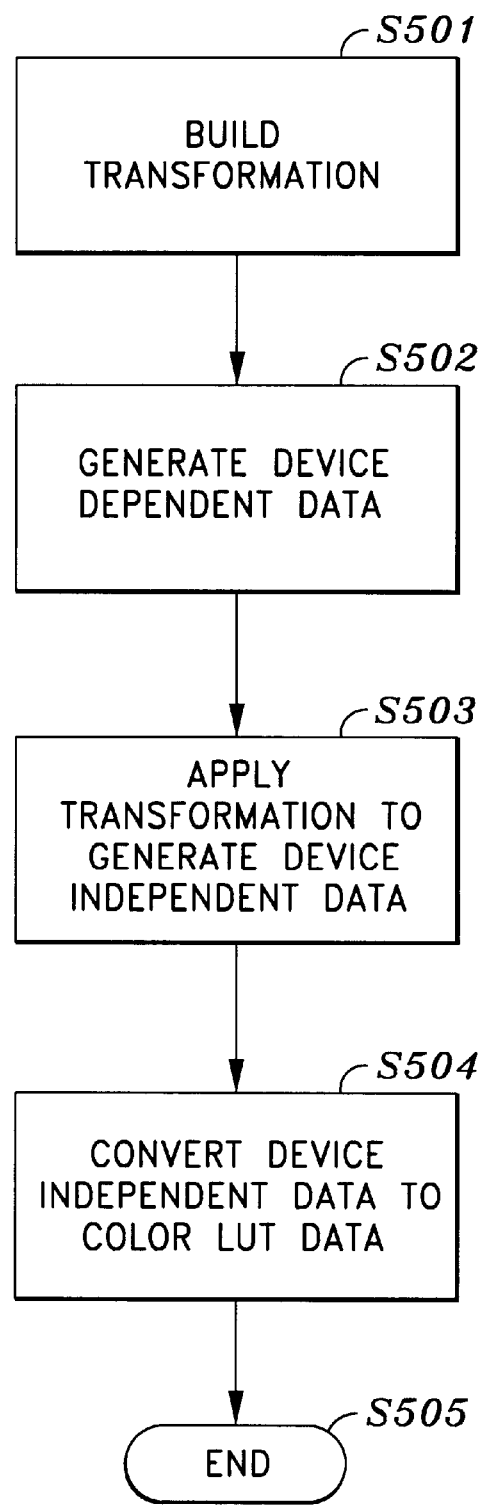
FIG. 5 illustrates a flow diagram of process steps to generate a color LUT using a CMS according to the present invention.

Thus, where the maximum value is 255 and the number of grid points is 3 (for a color LUT 303 arranged as a 3×3×3 grid), the step is 127.5. With an RGB value range of 0 to 255, for example, one end of the grid represents R, G and B values of 0 and at the opposite end of the grid, a grid point represents R, G and B values of 255 with each step in the grid representing a 127.5 change. To further illustrate, where a 33×33×33 grid is used, each grid point represents a 255/(33−1), or 7.9688, step. The 3×3×3 grid has 27 grid points while the 33×33×33 grid comprises 35,937 grid points. FIG. 5 illustrates a flow diagram of process steps to generate a color LUT 303 using CMS 302 according to the present invention. The process steps shown in FIG. 5 are computer-executable process steps stored as code on a computer-readable medium such as disk 6.

At step S501, a transformation is built (e.g., color transformation module 304) using profile 301. At step S502, device dependent data (e.g., device dependent color data 405) corresponding to the grid points in the desired table is generated. The grid size of color LUT 303 is used to determine a step size as discussed above.

Values are generated for each of the color components starting at the minimum value and incrementing by step size to the maximum value.

Where, for example, the value range is from 0 to 255 and a step of 127.5 is used, a total of 27 colors (one for each of the grid points in a 3×3×3 grid) are generated at step S503. In the RGB color space, each of the 27 colors comprise three values representing the R, G and B color components.

At step S503, the transformation build in step S501 is used to generate device independent data (e.g., device independent color appearance data 409).

At step S504, device independent color appearance data 409 is converted to color LUT 303 data. This step is used to convert between internal data formats (e.g., floating point numbers to integer fractions), if such is needed. Where, for example, device independent color appearance data 409 is in floating point format it may be converted to integer fractions in step S504. Processing ends at step S505. The process steps of FIG. 5 may be performed for each instance of color LUT 303 generated by CMS 302.

CMS 302 may generate a single instance of color LUT 303 for use in converting color data between color spaces (e.g., from device dependent color space to device independent color space, or vice versa). In addition, one or more instances of color LUT 303 may be generated by CMS 302 to determine based on scores generated using test data, what size color LUT 303 is appropriate for use by the CMS 302 given the scoring factors 305. That is, scoring factors 305 are applied to the results of testing performed by CMS 302 using test data and the one or more instances of color LUT 303.

Figure 6:
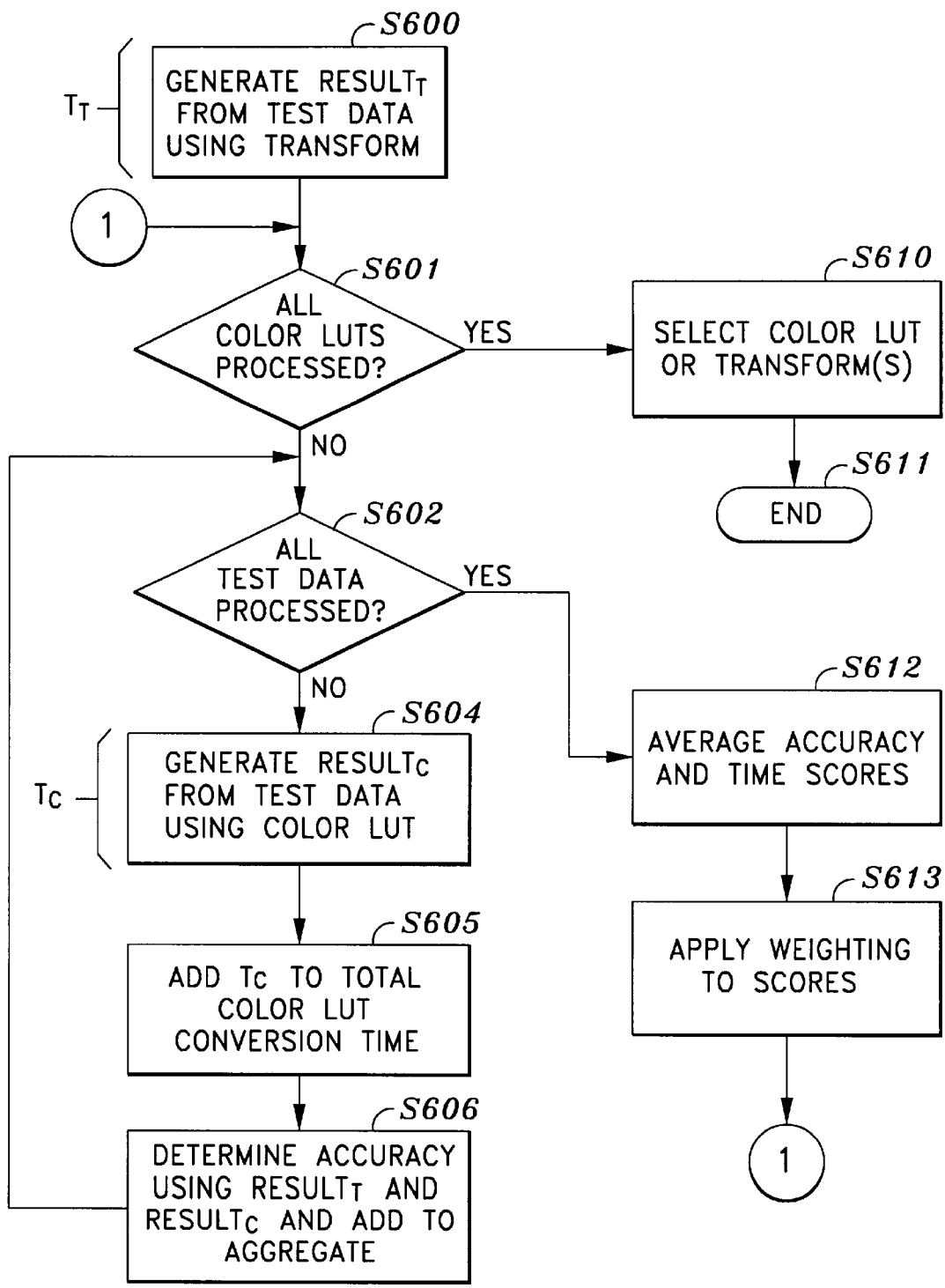
FIG. 6 illustrates a flow diagram of process steps to process test data and apply scoring factors to using one or more instances of a color LUT according to the present invention.

FIG. 6 illustrates a flow diagram of process steps to process test data and apply scoring factors 305 to scores associated with one or more instances of color LUT 303 according to the present invention. The process steps shown in FIG. 6 are computer-executable process steps stored as code on a computer-readable medium such as disk 6.

The example of FIG. 6 assumes that the same test data is used for each instance of color LUT 303. To test interpolated values, the test data should not represent a grid point in any of the instances of color LUT 303 that is tested. However, where it is difficult to select the same test data that falls between grid points for all of the instances of color LUT 303, it may be necessary to use different test data for different instances of color LUT 303.

In a case that the same test data is used, beginning at step S600 each of the colors in the test data becomes input to color transformation module 304 to generate device independent color appearance data 409 for each of the colors in the test data. In particular, a result, $R_t$, is determined for each of the colors that are input to color transformation module 304. The $R_t$ value for a given one of the colors is then compared to a result, $R_c$, of the conversion of the same color data using color LUT 303.

There is a result $R_T$ and $R_C$ for each of the colors in the test data. Each $R_T$ and $R_C$ include a value for each of the color components in the device independent color space of device independent color appearance data 409. For example, where device independent color space 409 is in CIELab color space, results $R_T$ and $R_C$ include the L, a and b color components. A difference is determined between the L, a and b components of a given $R_T$ and a corresponding $R_C$ to generate a Delta E value which is used to determine an accuracy associated with a conversion using color LUT 303 as compared to conversion using color transformation module 304. The calculation of a difference is defined for CIELab, for example, as the Euclidean "distance" between $R_T$ and $R_C$ defined as the square-root of the sum of the squares of the difference in "L", the difference in "a" and the difference in "b".

A timer, $T_T$, is calculated that represents an amount of time to convert the test data using color transformation module 304. A similar time, $T_C$, is used that represents an amount time to convert the test data using color LUT 303. Timers $T_T$ and $T_C$ may then be compared to determine which conversion is more efficient given the particular computing system in which CMS 302 is executing.

In addition to the timers $T_T$ and $T_C$, a scoring is associated with the size of each instance of color LUT 303 that is tested as well as an associated conversion accuracy.

Weights may also be applied to the scoring to take into account a defined priority associated with memory, speed and accuracy factors.

At step S601, a determination is made whether all the instances of color LUT 303 have been processed. If so, processing continues at step S610 to select a color LUT 303 or use transformation module 304. Selection is described in more detail below with reference to a selection process flow example of FIG. 7. Once selection is completed, processing ends at step S611.

Thereafter, CMS 302 uses color transformation module 304 or color LUT 303 according to the selection made. Instances of color LUT 303 generated by CMS 302 and the test results (e.g., timer and accuracy values) may be retained such that CMS 302 can make another selection in a case where scoring factors 305 are altered and/or the computer environment (e.g., computer resources) changes.

If, however, in the current selection process, it is determined, at step S601, that all of the instances of color LUT 303 have not yet been processed, processing continues at step S602 to generate scoring data for the next instance of color LUT 303.

At step S602, a determination is made whether or not all of the test data has been processed by the current instance of color LUT 303. If not, processing continues at step S604 to generate result, $R_C$, using the next color in the test data. At step S605, the time, $T_C$, taken to generate result, $R_C$, is added to an aggregate time. At step S606, an accuracy determination is made using results $R_T$ and $R_C$.

For example, a Delta E value representing a "color difference" between the $R_T$ and $R_C$ results can be calculated for the current test color. The Delta E value being added to an aggregate of the Delta E values from previously-processed colors in the test data. Processing then continues at step S602 to process any remaining test colors.

If it is determined, at step S602, that all of the test data has been processed for the current color LUT 303, processing continues at step S612 to determine an average accuracy based on the aggregate determined in step S606, and an average time based on the total time determined in step S605. At step S613 a weighting defined in scoring factors 305 is applied to the accuracy and time averages determined in step S612. Processing continues at step S601 to process any remaining instances of color LUT 303.

A memory score is also associated with an instance of color LUT 303 in addition to the speed and accuracy scores determined in FIG. 6. As with the speed and accuracy scores, a weight may be applied to the memory score to set a priority relative to speed and accuracy scores of an instance of color LUT 303. In the example described herein, because of the manner in which scoring is performed, a lower score is preferable over a larger score and weighting is such that a lower number is associated with a higher priority (e.g., a priority of 1 is the highest priority with a priority of 5 being a lower priority). However, it should be apparent that any technique for scoring and/or assigning priorities may be used with the present invention.

One approach to assigning a score to the memory used by an instance of color LUT 303 is based on the size (e.g., the number of grid points) of the table. The ranking is dependent on whether or not it is desired to conserve memory.

For example, where memory conservation is desired, the smaller the table size the lower the score. In some instances, a computer system has addressing limitations (e.g., addresses above 64 megabytes), or memory is shared with other programs executing in the computer system. Alternatively, when there is no concern for memory usage, the largest table size that may be accommodated by the available memory is given the lower score. Preferably, scoring factors 305 include an indication of which table size is to receive the lower score. A weight associated with memory may then be applied to the score assigned to each instance of color LUT 303.

With weighted scores associated with each instance of color LUT 303 and an average of time, $T_T$, CMS 303 determines an optimum instance of color LUT 303 and whether to use an instance of color LUT 303 or use color transformation module 304.

Figure 7:
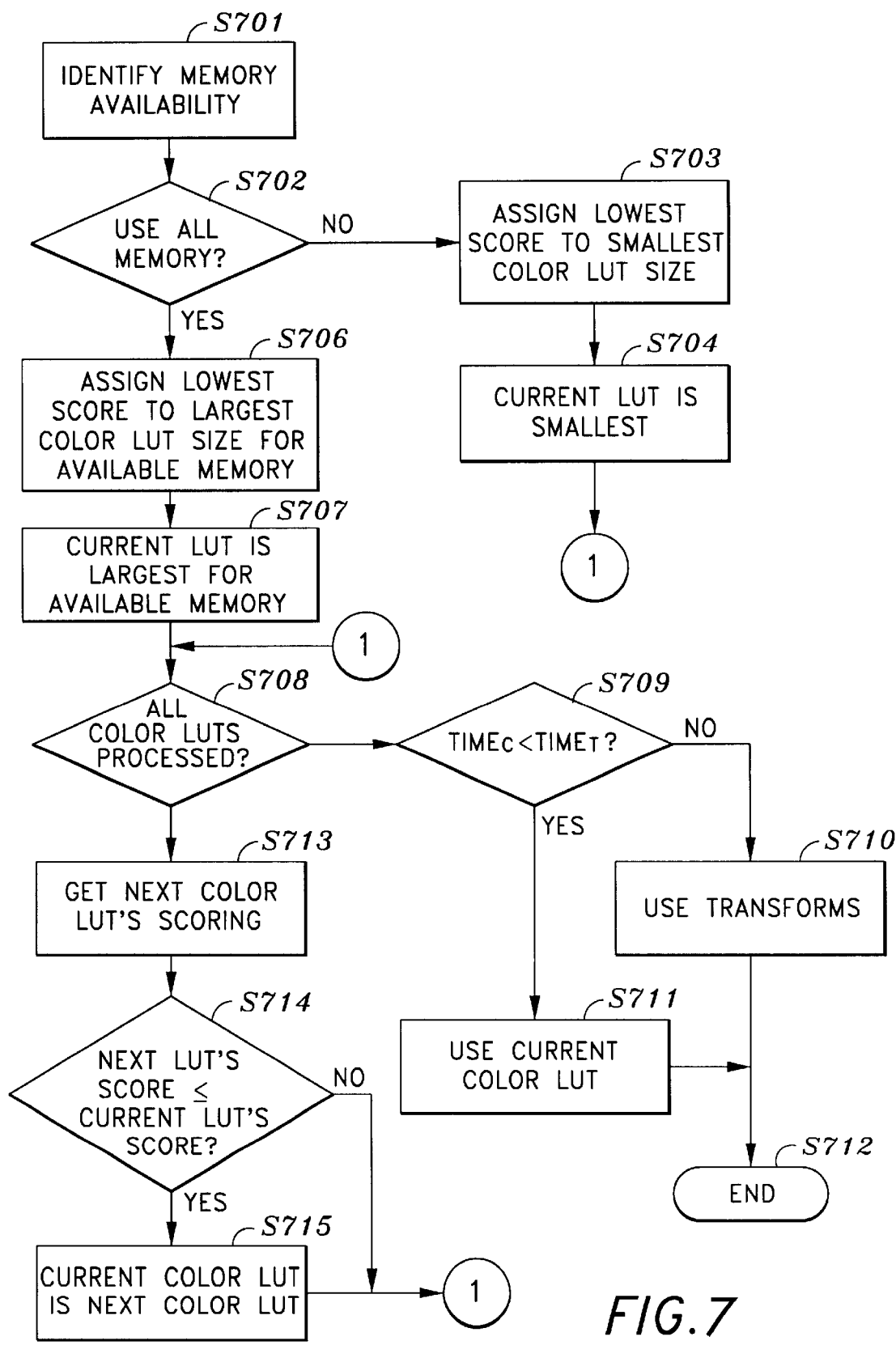
FIG. 7 illustrates a flow diagram of process steps to select a color LUT or color transformation module based on scoring generated according to the present invention.

FIG. 7 illustrates a flow diagram of process steps to select a color LUT 303 or color transformation module 304 based on scoring generated according to the present invention. The process steps shown in FIG. 7 are computer-executable process steps stored as code on a computer-readable medium such as disk 6.

At step S701, the total amount of memory available is determined. This information is used to determine the largest color LUT 303 that may be used given the amount of available memory. As discussed above, a score is assigned to each instance of color LUT 303 that may be stored in the available memory.

At step S702, a determination is made whether to conserve memory, or use all of the available memory based on information in scoring factors 305.

If it is determined, at step S702, that scoring factors 305 indicates that conservation of memory is desired, processing continues at step S703 to assign the lowest memory score to the instance of color LUT 303 with the smallest size and the greatest memory score to the largest instance of color LUT 303. Processing continues at step S704 to identify the smallest sized instance of color LUT 303 as the current LUT. Processing continues at step S708 to process instances of color LUT 303.

However, if it is determined, at step S702, that the all of the available memory is to be used, processing continues at step S706 to assign the lowest score to the largest instance of color LUT 303 that fits in the available memory. Processing continues at step S707 to set the current LUT as the largest instance of color LUT 303 identified in step S706. Processing continues at step S708 to process instances of color LUT 303.

At step S708, a determination is made whether all instances of color LUT 303 have been processed. If not, processing continues at step S713 to get the scores for the next (or first) instance of color LUT 303. At step S714, a determination is made whether the combined scores for the next instance of color LUT 303 is less than or equal to the combined scores of the current instance of color LUT 303. If not, processing continues at step S708 to process any remaining instances of color LUT 303. If it is determined, at step S714, that the combined scores of the next instance of color LUT 303 are less than or equal to the current instance of color LUT 303, processing continues at step S715 to set the current instance of color LUT 303 to be the next instance of color LUT 303. Processing continues at step S708 to process any remaining instances of color LUT 303.

If it is determined, at step S708, that all of instances of color LUT 303 have been processed, processing continues at step S709.

Where the time used to convert the test color data (i.e., time $T_C$) is not less than the time used to convert the test data using color transformation module 304, it is preferable to use color transformation module 304. Since interpolations are avoided using color transformation module 304, accuracy may thereby be improved with no impact on speed.

Thus, at step S709, a determination is made whether the time, $T_C$, associated with the current instance of LUT 303 is less than time, $T_T$. If not, processing continues at step S710 to use color transformation module 304. However, if time, $T_C$ is less than time, $T_T$, associated with using color transformation module 304, processing continues at step S711 to use the current instance of color LUT No 303. Processing ends at step S712 in either case.

Figure 8:
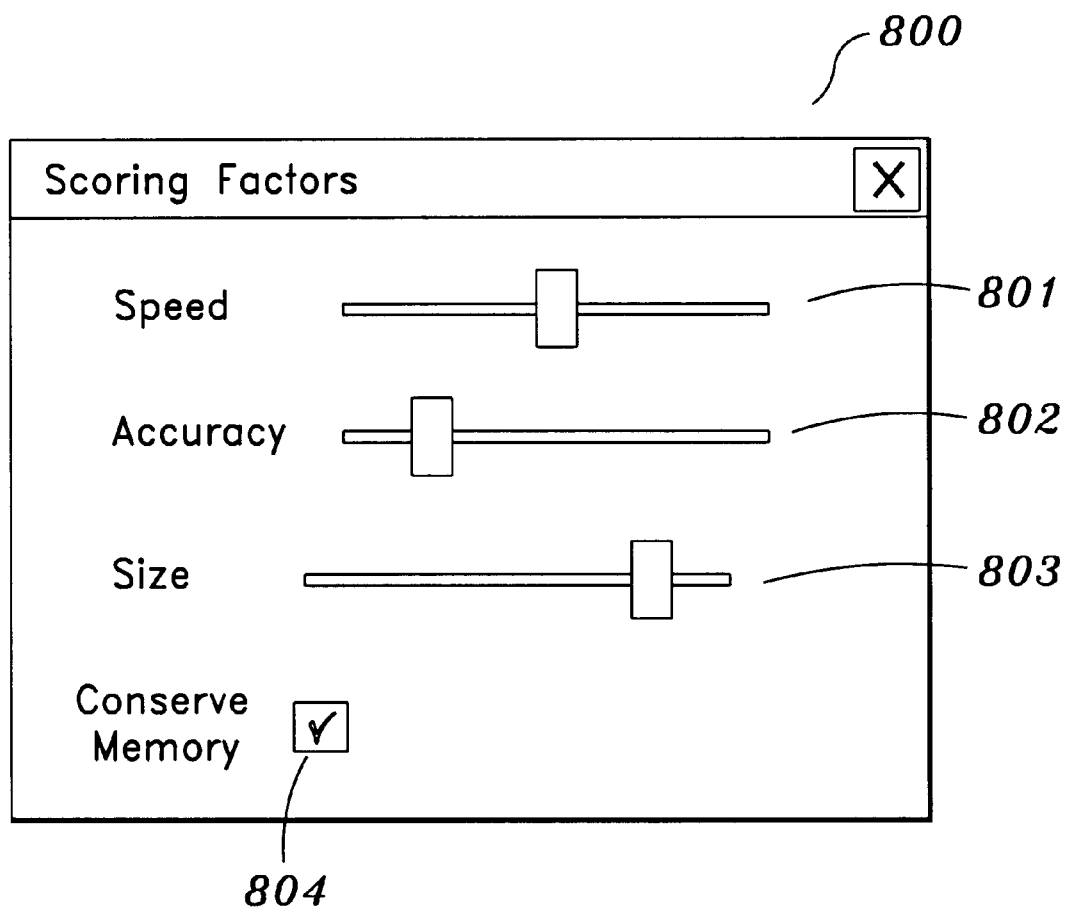
FIG. 8 provides an example of a graphical user interface for input of scoring factors according to the present invention.

Scoring factors 305 may be set in various ways. A user interface may be used such as the one illustrated in FIG. 8 may be used to set scoring factors 305. In the example of FIG. 8, user interface 800 includes sliders 801, 802 and 803 for designating a priority associated with speed, accuracy and size factors, respectively. In addition user interface 800 includes a check box 804 to specify whether or not memory is to be conserved (or consumed) when selected a color LUT 303.

As an alternative to sliders 801 through 803, user interface may contain input boxes to accept input from the keyboard and/or mouse input to set the scoring factors. User interface 800 may be used by an end user, a system administrator, etc.

In this regard, the invention has been described with respect to particular illustrative embodiments. However, it is to be understood that the invention is not limited to the above-described embodiments and that various changes and modifications may be made by those of ordinary skill in the art without departing from the spirit and the scope of the invention.

What is claimed is:

1. A method, for use in a color management system executing in a computer system, for dynamically generating, using device profile information, a look-up table for conversion of color data from one color space to another, the method comprising:
    assigning a weight to each of table size, speed and accuracy factors;
    determining, for plural table sizes, corresponding speed and accuracy scores using the color management system;
    determining, for each of the plural table sizes, an aggregate of weighted scores corresponding to table size and speed and accuracy;
    selecting one of the plural table sizes using the aggregate of each of the plural table sizes;
    generating a look-up table having a selected one of the plural table sizes.

2. A method according to claim 1, wherein determining, for plural table sizes, corresponding speed and accuracy scores using the color management system further comprises:
    generating, using the device profile, a table for each of the plural table sizes;
    converting color data using transformation operations of the color management system;
    determining a time score associated with converting the color data using the table;
    determining an accuracy score associated with converting the color data using the table.

3. The method according to claim 2, wherein determining an accuracy score associated with converting the color data using the table further comprises:
    transforming color data using transformation operations of the color management system and the device profile;
    determining a difference between the transformed color data and the converted color data.

4. A method according to claim 1, wherein a weight assigned to each of table size, speed and accuracy scores is determined using a user interface.

5. A method according to claim 1, wherein a weight assigned to each of table size, speed and accuracy scores is retained in storage for access by the color management system.

6. A method according to claim 1, wherein a weight assigned to each of table size, speed and accuracy scores is determined based on a determination of resources of the computer system.

7. A method for use in a color management system executing in a computer system, for dynamically generating at runtime, using device profile information, a look-up table for conversion of color data from one color space to another, the method comprising:
    building a transformation using the device profile;
    selecting, at runtime, a grid interval from a plurality of grid intervals, the selected grid interval corresponding to a step value between grid points for a color look-up table;
    generating device dependent color data, as a range of values stepping by the selected grid interval; and
    converting the device dependent color data into device independent color data using the transformation; and
    building the color look-up table using the device independent color data.

8. A method according to claim 7, further comprising:
    obtaining input of a user with respect to a plurality of factors,
    wherein the grid interval and a grid size are determined based on the plurality of factors.

9. A method according to claim 8, wherein the plurality of factors include speed.

10. A computer-readable memory medium in which computer-executable process steps are stored, the process steps for use in a color management system executing in a computer system, for dynamically generating, using device profile information, a look-up table for conversion of color data from one color space to another, wherein the process steps comprise:
    an assigning step to assign a weight to each of table size, speed and accuracy factors;
    a first determining step to determine, for plural table sizes, corresponding speed and accuracy scores using the color management system;
    a second determining step to determine, for each of the plural table sizes, an aggregate of weighted scores corresponding to table size and speed and accuracy;
    a selecting step to select one of the plural table sizes using the aggregate of each of the plural table sizes;
    a generating step to generate a look-up table having a selected one of the plural table sizes.

11. A computer-readable memory medium according to claim 10, wherein determining, for plural table sizes, corresponding speed and accuracy scores using the color management system further comprises:
    a generating step to generate, using the device profile, a table for each of the plural table sizes;
    a converting step to convert color data using transformation operations of the color management system;
    a determining step to determine a time score associated with converting the color data using the table;
    a determining step to determine an accuracy score associated with converting the color data using the table.

12. A computer-readable memory medium according to claim 11, wherein the step to determine an accuracy score associated with converting the color data using the table further comprises:
    a transforming step to transform color data using transformation operations of the color management system and the device profile;

a determining step to determine a difference between the transformed color data and the converted color data.

13. A computer-readable memory medium according to claim 10, wherein a weight assigned to each of table size, speed and accuracy scores is determined using a user interface.

14. A computer-readable memory medium according to claim 10, wherein a weight assigned to each of table size, speed and accuracy scores is retained in storage for access by the color management system.

15. A computer-readable memory medium according to claim 10, wherein a weight assigned to each of table size, speed and accuracy scores is determined based on a determination of resources of the computer system.

16. Computer-executable program code stored on a computer readable medium, said computer-executable program code for use in a color management system executing in a computer system, for dynamically generating, using device profile information, a look-up table for conversion of color data from one color space to another, the computer-executable program code comprising:

> code to assign a weight to each of table size, speed and accuracy factors;
>
> code to determine, for plural table sizes, corresponding speed and accuracy scores using the color management system;
>
> code to determine, for each of the plural table sizes, an aggregate of weighted scores corresponding to table size and speed and accuracy;
>
> code to select one of the plural table sizes using the aggregate of each of the plural table sizes;
>
> code to generate a look-up table having a selected one of the plural table sizes.

17. Computer-executable program code according to claim 16, wherein the code to determine, for plural table sizes, corresponding speed and accuracy scores using the color management system further comprises:

> code to generate, using the device profile, a table for each of the plural table sizes;
>
> code to convert color data using transformation operations of the color management system;
>
> code to determine a time score associated with converting the color data using the table;
>
> code to determine an accuracy score associated with converting the color data using the table.

18. Computer-executable program code according to claim 17, wherein the step to determine an accuracy score associated with converting the color data using the table further comprises:

> code to transform color data using transformation operations of the color management system and the device profile;
>
> code to determine a difference between the transformed color data and the converted color data.

19. Computer-executable program code according to claim 16, wherein a weight assigned to each of table size, speed and accuracy scores is determined using a user interface.

20. Computer-executable program code according to claim 16, wherein a weight assigned to each of table size, speed and accuracy scores is retained in storage for access by the color management system.

21. Computer-executable program code according to claim 16, wherein a weight assigned to each of table size, speed and accuracy scores is determined based on a determination of resources of the computer system.

22. A computer-readable memory medium in which computer-executable process steps are stored, the process steps for use in a color management system executing in a computer system, for dynamically generating at runtime, using device profile information, a look-up table for conversion of color data from one color space to another, wherein the process steps comprise:

> a building step to build a transformation using the device profile;
>
> a selecting step of selecting, at runtime, a grid interval from a plurality of grid intervals, the selected grid interval corresponding to a step value between grid points for a color look-up table;
>
> a generating step to generate device dependent color data, as a range of values stepping by the selected grid interval;
>
> a converting step to convert the device dependent color data into device independent color data using the transformation; and
>
> a building step to build the color look-up table using the device independent color data.

23. Computer-executable program code stored on a computer readable medium, said computer-executable program code for use in a color management system executing in a computer system, for dynamically generating at runtime, using device profile information, a look-up table for conversion of color data from one color space to another, said computer-executable program code comprising:

> code to build a transformation using the device profile;
>
> code to select, at runtime, a grid interval from a plurality of grid intervals, the selected grid interval corresponding to a step value between grid points for a color look-up table;
>
> code to generate device dependent color data, as a range of values stepping by the selected grid interval;
>
> code to convert the device dependent data into device independent color data using the transformation; and
>
> code to build the color look-up table using the converted color data.

* * * * *

UNITED STATES PATENT AND TRADEMARK OFFICE
CERTIFICATE OF CORRECTION

PATENT NO. : 6,642,931 B1
DATED : November 4, 2003
INVENTOR(S) : John S. Haikin et al.

It is certified that error appears in the above-identified patent and that said Letters Patent is hereby corrected as shown below:

Column 6,
Line 34, "(e.g." should read -- e.g., --.

Column 11,
Line 1, "No. 303." should read -- 303. --; and
Line 10, "selected" should read -- selecting --.

Column 12,
Line 15, "data," should read -- data --; and
Line 16, "interval; and" should read -- interval; --.

Column 14,
Lines 27 and 48, "data," should read -- data --.

Signed and Sealed this

Seventh Day of September, 2004

JON W. DUDAS
*Director of the United States Patent and Trademark Office*